(12) United States Patent
Anderlind et al.

(10) Patent No.: US 6,781,972 B1
(45) Date of Patent: Aug. 24, 2004

(54) METHOD AND SYSTEM FOR SUBSCRIBER-CONFIGURABLE COMMUNICATIONS SERVICE

(75) Inventors: Erik Anderlind, Parsippany, NJ (US); Scott C. Miller, Freehold, NJ (US); Mohamed Rahman, Randolph, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/540,933

(22) Filed: Mar. 31, 2000

(51) Int. Cl.[7] .......................... H04L 12/28; H04Q 7/20
(52) U.S. Cl. .................. 370/329; 370/349; 370/352; 455/412; 455/414
(58) Field of Search .............................. 370/252, 328, 370/329, 338, 349, 351, 352, 389, 401; 379/88.08, 88.17, 88.22, 243, 258, 268, 269, 280; 455/412, 414, 445, 450, 456, 461

(56) References Cited

U.S. PATENT DOCUMENTS

| | | | |
|---|---|---|---|
| 6,181,927 B1 * | 1/2001 | Welling et al. | 455/414.1 |
| 6,195,545 B1 * | 2/2001 | Baker et al. | 455/414.1 |
| 6,295,456 B1 * | 9/2001 | Baker et al. | 455/463 |
| 6,546,002 B1 * | 4/2003 | Kim | 370/351 |
| 6,571,095 B1 * | 5/2003 | Koodli | 455/435.1 |

FOREIGN PATENT DOCUMENTS

| | | |
|---|---|---|
| WO | WO 93/07566 | 4/1993 |
| WO | WO 97/22936 | 6/1997 |
| WO | WO 97/41654 | 11/1997 |
| WO | WO 99/33293 | 7/1999 |

OTHER PUBLICATIONS

Han et al., Dynamic Adaptation in an Image Transcoding Proxy for Mobile Web Browsing, IBM T.J. Watson Research Center, IEEE Personal Communications, Dec. 1998, p. 8–17.

* cited by examiner

Primary Examiner—Alpus H. Hsu

(57) ABSTRACT

A method and system for providing configurable data services for mobile stations allows mobile stations to select the type and content of data messages addressed to a mobile station. The method includes establishing an active profile associated with a corresponding mobile station. A wireless data server receives a data message addressed to the mobile station. The active profile for the mobile station is accessed to determine applicable stored profile attributes for the mobile station to which the received data message is addressed. The wireless data server detects received profile attributes associated with the received data message. Filtering is applied to the received data message in real-time based on a comparison between the detected profile attributes and the stored profile attributes. The detected profile attributes are readily standardized in accordance with standards followed by the content service provider in order to gain access to the mobile service subscribers.

18 Claims, 5 Drawing Sheets

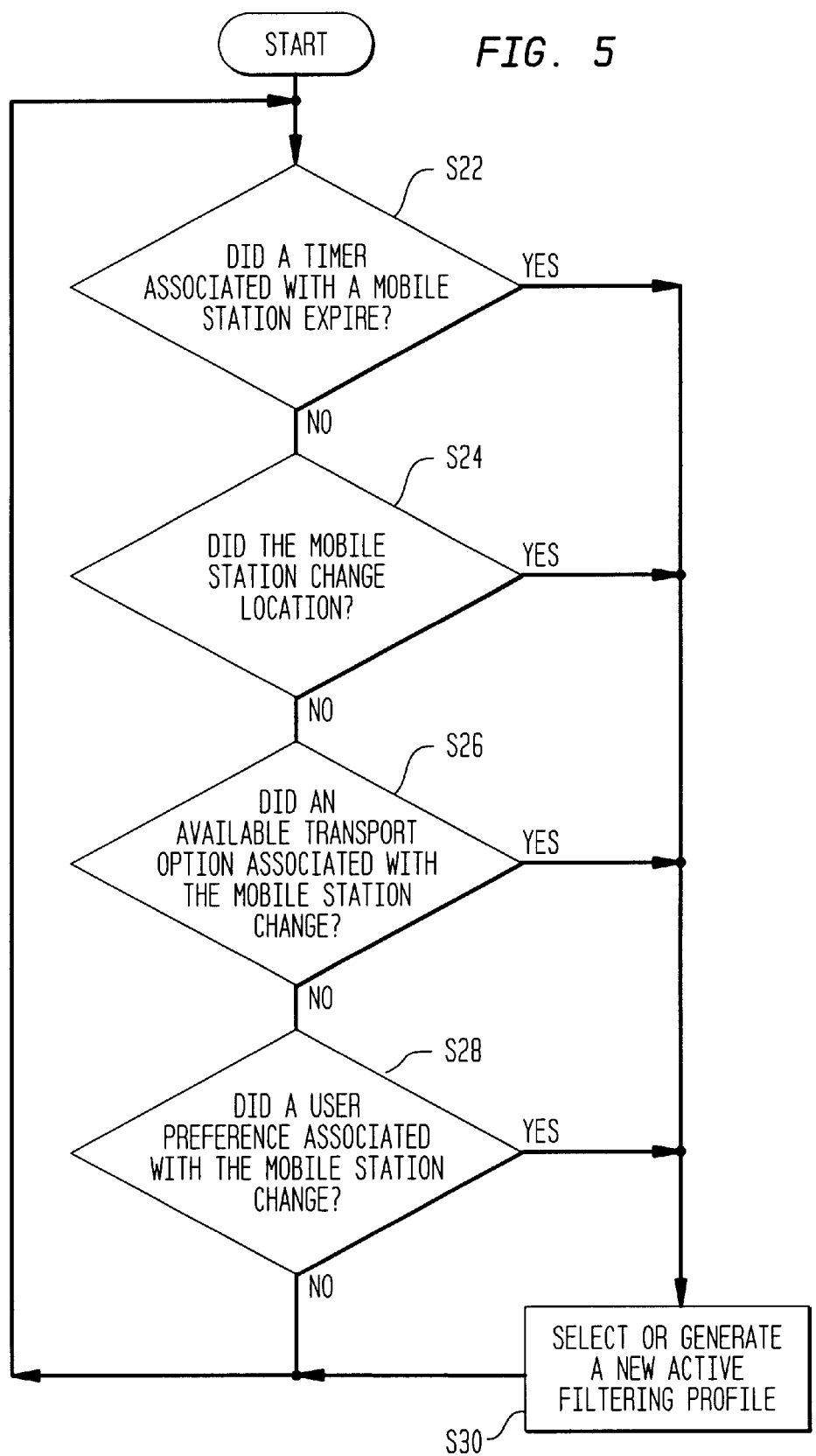

METHOD AND SYSTEM FOR SUBSCRIBER-CONFIGURABLE COMMUNICATIONS SERVICE

FIELD OF THE INVENTION

The invention relates to wireless communication systems and more particularly to a method and system for providing subscriber-configurable communications service for mobile stations.

BACKGROUND

A wireless data server extends data messaging to users of a wireless communication system. The conventional wireless data server supports message notification, delivery and redirection mechanisms for mobile subscribers. However, the conventional wireless data server often lacks flexibility concerning the manner in which services are offered. For instance, the service provider may completely dictate the scope of offered services, rather than allowing a subscriber to configure data services associated with the wireless data server, for various technical reasons. Subscribers may generally lack the technical sophistication to properly configure data services in a manner that is compatible with the sound technical operation of the underlying wireless communication system. Providing the subscribers with tools to configure services may negatively impact traffic capacity available for other subscribers on the underlying wireless system. Thus, a need exists for providing user-configurable communications service to wireless subscribers.

In the prior art, a client, such as a computer station, may be coupled to a communications network (e.g., the internet). A client-resident program may filter e-mail upon receipt at the client after the service provider has delivered the message to the client over the communications network. For example, the program may selectively forward, delete, or move incoming e-mail from one electronic folder to another after being triggered by an incoming message. Similarly, a client-resident program may filter a message or an undesired portion of a message based on an assessment of the content of the message. If the client is a wireless terminal or mobile station, the receipt and processing of unwanted data messages (e.g., e-mails) tends to detract from the longevity of each battery charge of the mobile station. The undesired incoming data messages not only impact customer satisfaction because available transmit (e.g., talk) time is reduced, the undesired incoming data messages detract from the potential capacity of the communications network (e.g., internet).

However, the service provider may monitor and delete incoming messages from blacklisted internet protocol (IP) domains before the incoming messages are delivered to the client, to reduce traffic over the communications network. Accordingly, the service provider is burdened with the responsibility of continually selecting and updating blacklisted IP domains for filtering under such an approach. Further, the service provider needs to make a judgment about what IP domains should be blacklisted, rather than leaving the decision up to the discretion of the subscriber. The service provider is placed in the awkward and controversial position of censuring content that is desired by certain subscribers and not others. Thus, a need exists for a filtering mechanism that may reduce traffic over the telecommunications network, while delivering desired messages to subscribers on a custom or preferential basis under the subscribers' discretion.

Another filtering approach which has been widely used for internet applications is the subscription authorization. A subscriber can subscribe or unsubscribe to an e-mail mailing list which forwards messages to the user on a regular basis or otherwise. The subscriber must actively subscribe and unsubscribe to the e-mail list. However, if the subscriber lacks technical sophistication or if the content provider makes unsubscribing difficult to promote its own commercial interests, the subscriber may be unable to stop the undesired flow of e-mail from a subscription list. Thus, there is a need for an alternative to subscription lists which allows an unsophisticated subscriber to readily and simply control the content of received data messages.

SUMMARY OF THE INVENTION

In accordance with the invention, a method and system for providing configurable communications services for mobile stations allows a subscriber to readily control the delivery of one or more data messages addressed to a mobile station and the parameters of one or more data messages received at the mobile station. The parameters may include the type and format of the data message, for example. The method includes establishing an active profile associated with a corresponding mobile station. The active profile may be variable in response to a triggering event. A wireless data server receives a data message addressed to the mobile station. The active profile for the mobile station is accessed upon or after the receipt of the data message at the wireless data server to determine applicable stored profile attributes of the established active profile. The wireless data server detects received profile attributes associated with the received data message. The received data message is filtered in real-time based on a comparison between the detected profile attributes and the stored profile attributes.

In accordance with one aspect of the invention, the wireless data server automatically changes the active profile upon the occurrence of a triggering event to alter the filtering of one or more data messages addressed to the mobile station. The subscriber may select one or more triggering events and affiliated consequences in advance of the receipt of data messages. A triggering event may include changing location of the mobile station, the expiration of a timer associated with the mobile station, changing an available transport option of the air interface for the mobile station (e.g., transition from digital to analog service at a particular time), or otherwise. Affiliated consequences include transmission of a complete data message to the mobile station, blocking the transmission of a data message to the mobile station, deleting a data message addressed to the mobile station, or filtering content of a data message addressed to a mobile station in a desired way.

BRIEF DESCRIPTION OF THE DRAWINGS

FIG. 5 is a flow diagram, illustrating step S10 of FIG. 4 in greater detail in accordance with the invention.

DETAILED DESCRIPTION OF PREFERRED EMBODIMENTS

Figure 1:
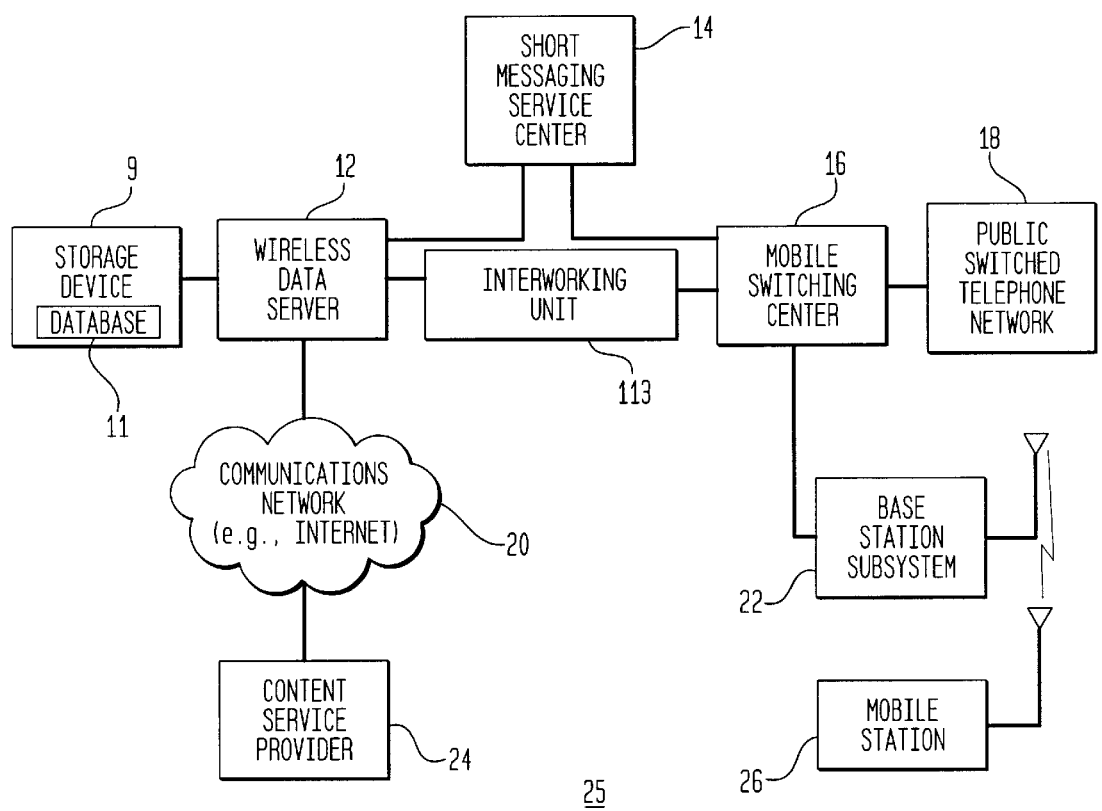
FIG. 1 is a block diagram of a wireless communication system in accordance with the invention.

In accordance with the invention, FIG. 1 shows a communication system 25 for providing subscriber-configurable data services. A content service provider 24 is coupled to a wireless data server 12 through a communications network 20, such as the internet. In one embodiment, the wireless data server 12 is coupled to a storage device 9, a short messaging service center 14, an interworking unit 113, and a mobile switching center 16. The mobile switching center 16 interconnects a base station sub-system 22 to the wireless data server 12 via the interworking unit 113, a short messaging service center 14, or both. The mobile switching center 16 may interconnect the base station sub-system 22 to a public switched telephone network 18. The base station sub-system 22 supports communication to one or more mobile stations 26.

In the downstream data path, the communications system 25, the communications system 25 operates as follows. The content service provider 24 originates or forwards a data message intended for a mobile station 26 served by the base station sub-system 22. The data message is transferred through the communications network 20 (e.g., internet) to a wireless data server 12 serving the mobile station 26. The wireless data server 12 may access a database 11 in the storage device 9 to determine how to handle the received data message. The wireless data server 12 may invoke a short messaging service center 14 to send a short message service message to the mobile station 26 via (the mobile switching center 16 and) the base station sub-system 22 to alert the mobile station 26 of the receipt of the data message. Alternatively, the wireless data server 12 may filter the data message by blocking the transmission of the data message to the mobile station 26 without sending a short messaging service message. For example, the operator of the wireless data server 12 may charge the content service provider 24 an access fee for access to the mobile stations 26 and if the content service provider 24 does not pay the requisite access fee, the wireless data server 12 may block the data message from transmission and receipt at the mobile station 26.

The wireless data server 12 may also convert the data message from a textual, graphical, multi-media, or visual data message to a verbal or oral data message for transmission over the base station sub-system 22 to the mobile station 26 to conserve the requisite bandwidth. The requisite bandwidth for a speech data message is typically much less than the bandwidth required to transmit a visual, multimedia, or graphical data message, particularly where the data message is rich in graphics or presented in another data-intensive format.

The interworking unit 113 provides an interface between the wireless data server 12 and the mobile switching center 16. The interworking unit 113 may pass through downstream speech messages to the mobile switching center 16. In contrast, the interworking unit 113 may process downstream data messages (or even speech) in a data packet format (e.g., asynchronous transfer mode adaptation layer two (AAL2)), a facsimile format, or some other suitable data format that is compatible with the mobile switching center 16. The data format ultimately provided by the interworking unit 113 depends upon whether the mobile switching center 16 supports circuit switching, packet switching, or both. In practice, the interworking unit 113 may comprise a server, which assigns internet protocol addresses to mobile stations to facilitate communication over the communications network 20.

The base station sub-system 22 may include a base station controller coupled to one or more base stations that serve the mobile station 26 over an air interface. The air interface may comply with a code-division, multiple-access (CDMA) wireless communications standard, a global system for mobile communications (GSM) or a time-division, multiple-access (TDMA) standard, for example.

The air interface has a transmission channel rate, which may refer to a downlink symbol transmission rate, an uplink symbol transmission rate, or both. The transmission channel rate may vary with the available bandwidth for a particular mobile station 26 or with the amount of modulating information to be transmitted over the air interface between the particular mobile station 26 and a base station of the base station subsystem 22. For example, CDMA schemes support variable rate vocoding of speech information, where breaks in conversation are not transmitted to conserve communication resources. The maximum channel rate depends upon the maximum available bandwidth for the particular mobile station 26.

The air interface has a propagational time delay for propagation of an electromagnetic signal (e.g., radio frequency signal) between a particular mobile station 26 and the base station, which varies with the physical distance between the particular mobile station 26 and the base station. If multipath reception is present, the propagational time delay may be influenced by contributions from a direct path between the mobile station 26 and the base station and indirect paths, due to multipath propagation, between the mobile station 26 and the base station. Besides the propagational time delay, changes in coding or retransmission schemes used for error correction, error detection, the modulation scheme, or otherwise may affect the time delay of the air interface for transmission between the mobile station 26 and the base station. Retransmission schemes are used to enhance reliability of wireless communication systems by repeating transmissions in case an earlier transmission was corrupted by interference or not received properly by a receiver of the base station or the mobile station 26.

Figure 2:
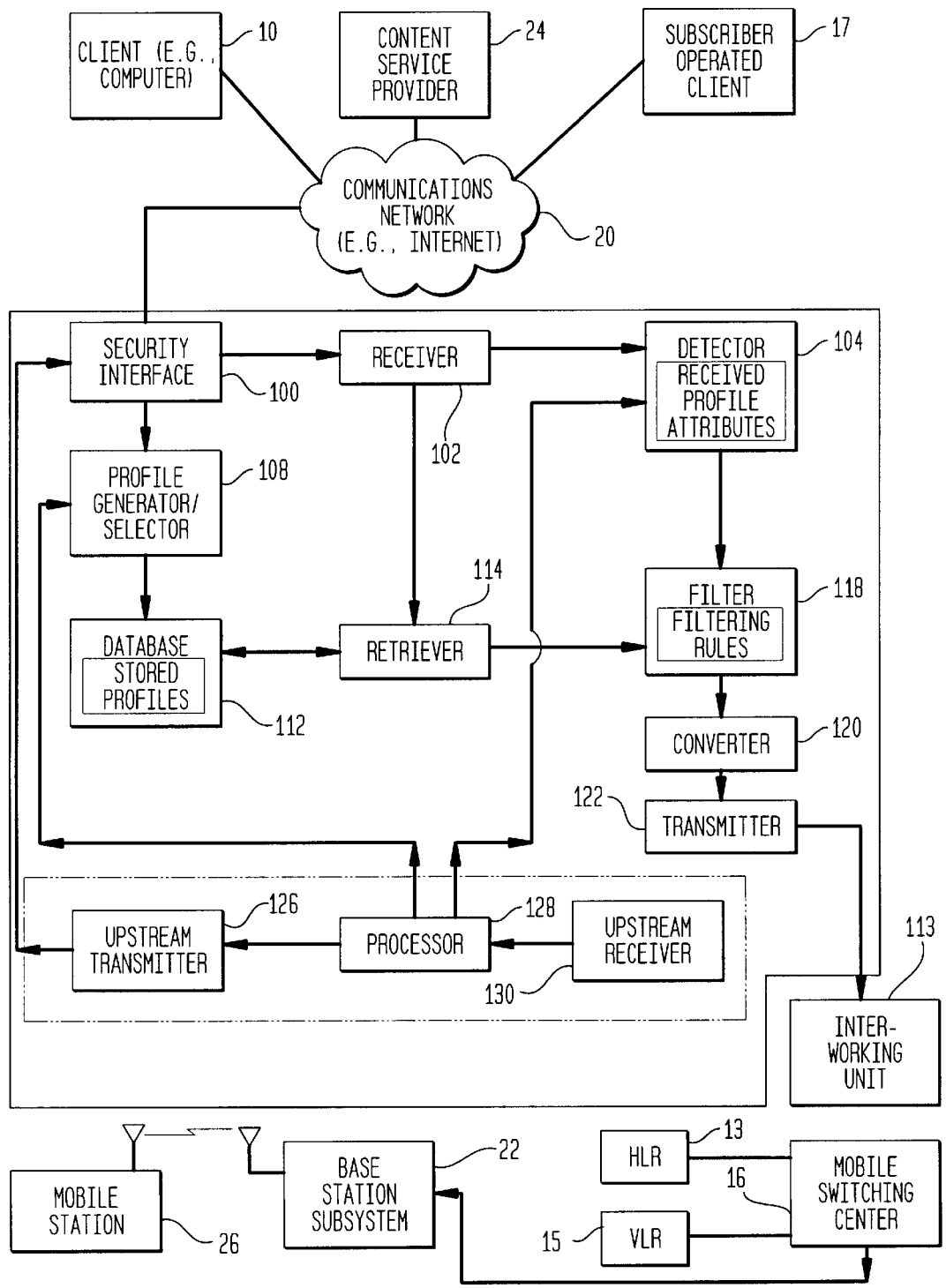
FIG. 2 is a block diagram that illustrates one embodiment of components for the wireless data server of FIG. 1.

FIG. 2 shows a block diagram of one embodiment of the wireless data server 12 of FIG. 1. As shown, the constituent blocks of the wireless data server 12 may represent software instructions, hardware components, or a combination of both hardware and software. The interconnections between the constituent blocks may include logical connections, physical databases, or both.

In the downstream path, the wireless data server 12 includes a security interface 100 coupled to a profile generator-selector 108 and a receiver 102. In turn, the profile generator-selector 108 is coupled to a database 110 for storing profiles 112 on the mobile stations 26. The receiver 102 is coupled to a retriever 114 and a detector 104 for detecting received profile attributes 106 associated with the received data messages. The retriever 114 communicates with the database 110 to retrieve stored profiles 112 or stored profile attributes for use by a filter 116. The stored profiles 112 contain filtering instructions that may be applied to the filter 116.

The filter 116 accepts input from the detector 104 and the retriever 114. The filter 116 provides an output to a converter 120. The filter 116 applies filtering rules 118 to the received data message based on a comparison of the received profile attributes 106 (detected by the detector 104) to stored profile attributes or stored profiles 112 (retrieved by the retriever 114 from the database 110). From the mobile station 26, the subscriber may change the active profile associated with the mobile station 26 to control or select the applicable filtering rule 118. The wireless server 12 follows the instructions of an active profile assigned to a corresponding mobile station 26, rather than inactive, stored profiles 112. The wireless data server 12 may automatically change the active profile associated with the mobile station 26 in response to the occurrence of triggering events.

The converter 120 accepts an output of a filtered data message from the filter 116. The converter 120 may convert the format of the filtered data message from a visual, multi-media, or graphical format to a verbal format suitable for transmission as speech over the air interface of the base station sub-system 22. The converter 120 provides a converter output to a transmitter 122. The transmitter 122 transmits the converted data message or speech data to the mobile switching center 16 with the possible intervention of the interworking unit 113, which provides a suitable signaling format (e.g., compressed or uncompressed pulse code modulation consistent with a DS1 transmission) for the mobile switching center 16.

With respect to the upstream data transmission path, the mobile station 26 may originate a reverse data message for transmission to a client 10 (e.g., internet user) via the communications network 20. The base station sub-system 22 receives the reverse data message and routes it to the mobile switching center 16. The mobile switching center 16 communicates to an upstream receiver 130 (e.g., pulse code modulation receiver). The upstream receiver 130 is coupled to a processor 128. The processor 128 may determine the appropriate destination address and data format for communications over the communications network 20. Although, not illustrated in the wireless data server 12 of FIG. 2, the processor 128 may include a converter for converting a speech message into a graphical or textual message for display at the client 10.

The processor 128 communicates with an upstream transmitter 126 to forward the appropriate reverse data message to the content service provider 24 or a client 10 coupled to the communications network 20. Accordingly, the mobile station 26 may generate an e-mail message in this manner or another voice message, which may be received by the client 10.

Besides originating a reverse data message for transmission to a client 10 of the communications network 20, the mobile station 26 may send a command to the wireless data server 12 to dynamically configure presently active communications services or features. Accordingly, the processor 128 determines if the reverse data message contains a request to update or alter a stored profile 112 in accordance with a user preference. If so, the processor 128 communicates an instruction to the profile generator-selector 108 to update the active profile (among the stored profiles 112) in the database 110 for the mobile station 26.

At the wireless data server 12 upon prior instruction or approval by the subscriber, the processor 128 may automatically change the active profile from a previous active profile to a revised active profile upon the occurrence of a triggering event. The revised active profile may result in the application of a different filtering rule than the previous active profile would apply. The subscriber establishes or selects one or more triggering event settings and affiliated consequences in advance of the receipt of data messages. The filtering rules define the affiliated consequences. A triggering event may include changing location of the mobile station 26, the expiration of a timer in the wireless data server 12 associated with the mobile station 26, the change of an available transport option for the mobile station 26 at a particular time, or otherwise.

A home location register (HLR) 13, a visitor location register (VLR) 15, the mobile switching center 16, the base station subsystem 22, or another network element may communicate data on one or more triggering events to the wireless data server 12. The processor 128 of the wireless data server 128 determines the appropriate selection of the revised active profile based on the receipt of triggering event data or other triggering event data. The HLR 13 or the VLR 15 preferably provides triggering event data on changing location of the mobile station 26 to the wireless data server 12. The mobile switching center 16 or the base station subsystem 22 may communicate the available transport option (e.g., CDMA, TDMA, or GSM) for the mobile station 26 at a particular time to the processor 128. Although the expiration of the timer could be provided to the wireless data server 12 from another network element, expiration of the timer may be handled internally with the wireless data server 12 or within the processor 128 itself.

Figure 3:
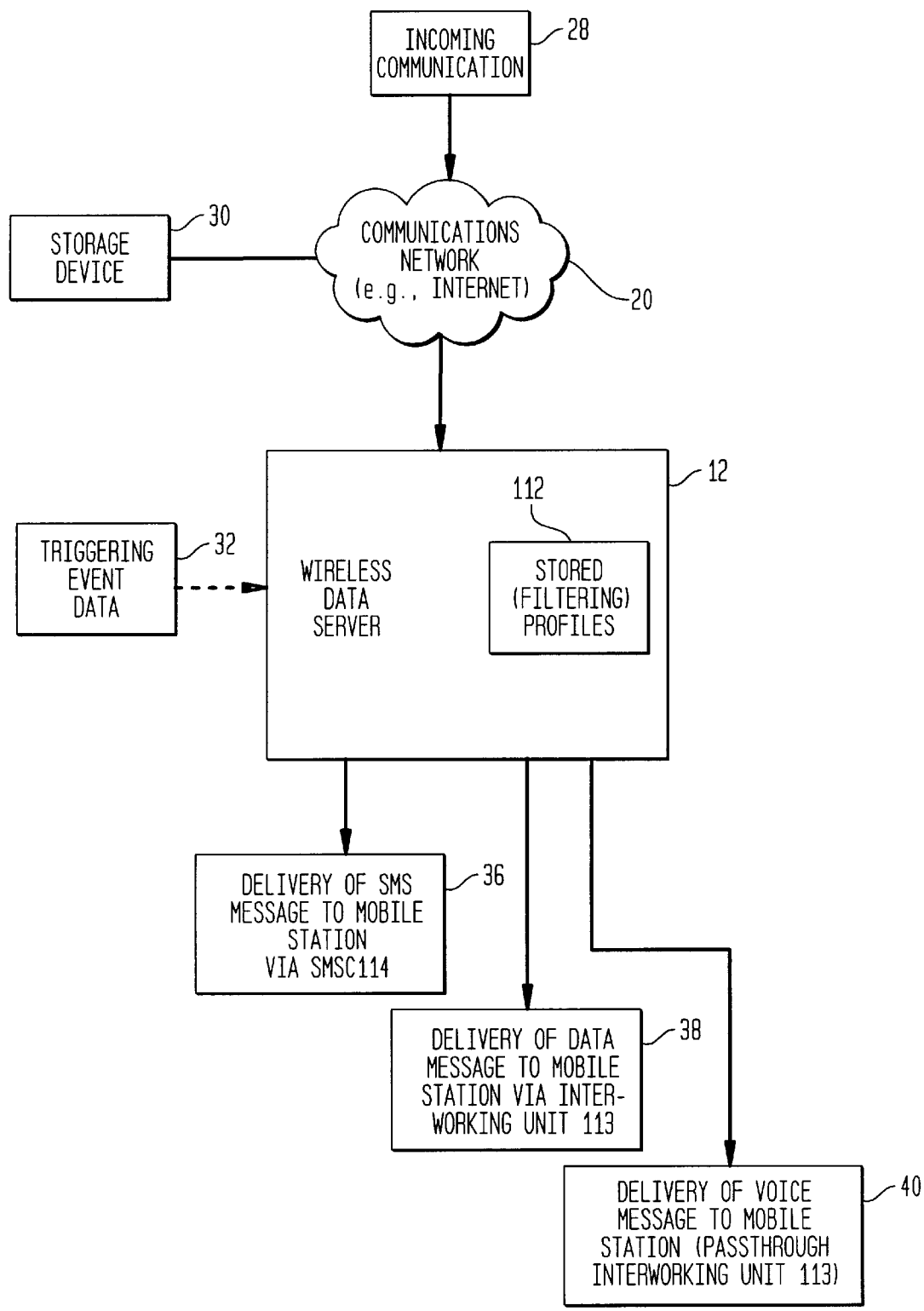
FIG. 3 a block diagram that illustrates the operation of a wireless data server in various alternate downstream data paths in accordance with the invention.

FIG. 3 presents downstream communications within the wireless communication system 25 consistent with FIG. 1 and FIG. 2. An incoming communication 28, such as a data message addressed to the mobile station 26 is transferred from a content service provider 24 or otherwise to the wireless data server 12 via a communications network 20. The wireless data server 12 contains the applicable filtering profiles 112 for the mobile station 26. Each profile 112 determines the filtering instructions that the filter 116 will undertake prior to or instead of delivering the incoming communication 28 to the mobile station 26 with or without modification.

A profile refers to at least one filtering instruction or rule applicable to an incoming communication, such as a data message addressed to the mobile station 26. Filtering instructions or rules control the delivery, redirection, deletion, content manipulation, priority, or other aspects of communications of data messages controllable by a wireless data server 12. Filtering may be used to block, pass, or alter the content of data messages at the wireless data server 12 in a manner consistent with efficient utilization of the air interface between the base station subsystem 22 and the mobile station 26. An active profile is one type of profile.

An active profile refers to a profile that is currently assigned to a corresponding mobile station based on subscriber input (e.g., preferences). The active profile may be selected from a group of profiles that are compatible with a particular mobile station 26 based on the technical capabilities of the particular mobile station 26 and subscriber preferences. A wireless data server 12 preferably manages the assignments of active profile for respective mobile stations. The wireless data server 12 may manage data storage and retrieval of profiles that are compatible with a particular mobile station 26.

The wireless data server 12 accepts input in the form of triggering event data 32 that may trigger switching between different active profiles among the filtering profiles 112. A triggering event may include changing the location of the mobile station 26, the expiration of a timer associated with the mobile station 26, changing an available transport option of the air interface for the mobile station 26, changing a time delay of the air interface for the mobile station 26, or any other event data that is provided as input to the wireless data server 12. The wireless data server 12 associates an active profile with each received incoming communication 28 with consideration of triggering event data 32. The wireless data server 12 may or may not provide an output in the form of a delivery message 36 to a mobile station based on the incoming communication 28. For example, the delivery of a data message may represent a modified version of the incoming communication 28 in which part of the incoming communication is blocked or filtered out.

The wireless data server 12 may select a delivery method from a group of possible delivery methods to determine how the message is delivered or forwarded. The group of delivery methods may include one or more of the following: short messaging service (SMS), translation of text into a voice call, fax output, transmission over a shared data channel, transmission over a dedicated data channel, and other suitable data transmission techniques. In addition to selecting a delivery method, the wireless data server 22 may determine a minimum quality of service for the transmission channel of the air interface for communication to the subscriber station.

The input of triggering events 32 may be detected by the detector 104 for the downstream path, by the processor 128 for the upstream path, or otherwise. The detector 104 may detect such triggering events 32 as received profile attributes 106 in the receive data message or a command from a subscriber using a subscriber-operated client 17. The assigning of triggering events 32 as certain received profile attributes allows filtering based on the content of incoming communication 28, for example.

The processor 128 may detect triggering events 32 as triggering event data from a network element of the communications system 25 or an external source. For example, the network element may be a HLR 13 or a VLR 15 coupled to the mobile switching center 16. The HLR 13 or the VLR 15 may communicate to the detector 104 via the upstream receiver 130 and the processor 128, for example. The HLR 13 or the VLR 15 may provide updates to profile attributes as the subscriber station moves throughout the wireless system or as the wireless service provider updates profile configurations of the mobile station 26. The HLR 13 and the VLR 15 conventionally provide subscriber location data, which may be readily used by the wireless data server 12 for profile modification of active profiles; hence, changes to filtering rules 118. The location data may be as general as an mobile switching center 16 (MSC) identifier upon which the particular mobile station 26 is presently active, a sector of a cell site, or the like.

The delivery of the data message from the wireless data server 12 to the mobile station 26 may take any one of three possible paths. In accordance with a first path 36, the data message is delivered by transmitting an SMS message to a mobile station 26 via the short messaging service center 14. In accordance with a second path 38, the data message is delivered by transmitting a message to the mobile station 26 via the interworking unit 113, which processed the data message for compatibility with the mobile switching center 16. In accordance with a third path 40, a voice message is delivered to the mobile station 26 by passing through the interworking unit 113 (without processing of the interworking unit 113) to the mobile switching center 16.

Figure 4:
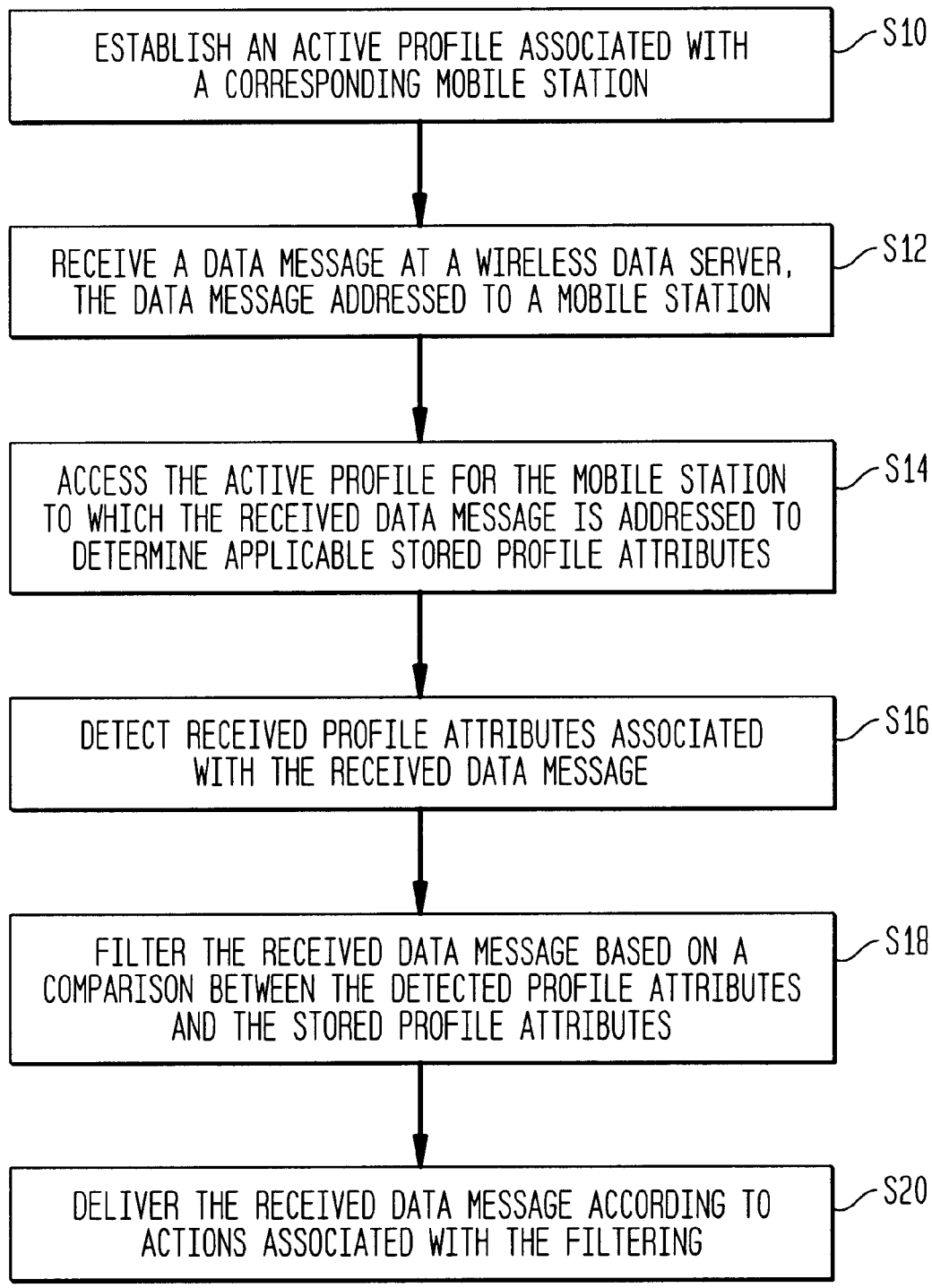
FIG. 4 is a block diagram of a method for changing an active profile based on the occurrence of a triggering event in accordance with the invention.

FIG. 4 is a flow diagram of a method of providing user configurable data services for mobile stations 26. Starting in step S10, the profile generator-selector 108 establishes an active profile associated with a corresponding mobile station 26. The active profile may be established in accordance with several alternative techniques.

In accordance with a first technique, a subscriber may access the wireless data server 12 by using a subscriber-operated client 17 (FIG. 2) such as a computer coupled to the communications network 20. Under the first technique, the subscriber accesses the wireless data server 12 through the internet, for example, via a computer. The access may be established over a wireline, optical or cable interface or another interface to the wireless data server 12 at a higher transfer rate or throughput than is typically available through the air interface supported by the mobile station 26. Accordingly, via the wireline, optical or cable interface, the subscriber is presented with the most convenient and most elaborate techniques or procedures for establishing the active profiles and any alternate profiles. The subscriber may, for example, set up a vacation profile as an alternate profile which can later be selected from either the subscriber-operated client 17 or the subscriber's mobile station 26.

In accordance with a second technique, a subscriber may select, from a menu of profiles, an active profile via the mobile station 26. Further, a subscriber may change from one established active profile to another via the mobile station 26.

In accordance with a third technique, the service provider may provide a default profile or a group of profiles for selection by the subscriber from either the mobile station 26 or from a subscriber-operated client 17. Thus, under the third technique, the system operator of service provider may select default profiles or groups of profiles that are consistent with the air interface and traffic capacity of the wireless communications network 25.

Step S10 may include the determination of filtering rules associated with corresponding active profiles or stored profile attributes. For example, a filtering rule may be determined based on a current mobile station transmission channel rate or an air interface delay. Alternately, a filtering rule may be determined based on mobile station location at or after the time of receipt of the data message at the wireless data server. A filtering rule may be defined as an if-then statement, where the if portion of the if-then statement addresses whether or not received profile attributes match the stored profile attributes of the active profile. The then portion of the if-then statement defines a desired filtering action.

After step S10, in step S12, a receiver 102 receives a data message at the wireless data server 12. The data message is addressed to the mobile station 26 or the wireless data server 12. The receiver 102 may read an address of the mobile station 26 from the data message or a header of the data message, for example. The mobile station identifier gleaned from the received data message may be used in the following step, S14.

In step S14, a retriever 114 accesses an active profile (of the stored profiles 112) for the mobile station 26 to which the received data message is addressed to determine the applicable stored profile attributes. The retriever 114 preferably accesses a database 110 of profiles to retrieve one or more profile attributes associated with the mobile station identifier of the mobile station 26. Accordingly, the database 110 may include mobile station identifiers associated with corresponding sets of stored profile attributes of stored profiles 112.

The stored profile attributes may be associated with corresponding filtering rules 118 for the data messages. The stored profile attributes may include one or more of the following: a sender identifier for the data message; a recipient list for the received data message; a time of day for the received data message; a subject key words within the data message; a key word within the body of the data message;

day of the week of the data message; and an estimate of the geographic location of the mobile station 26 when the data message is received by the mobile station 26. The estimate of the geographic location may be based on a last known location, a designated home location, or another desired location. Although the geographic location of the mobile station 26 is preferably based on an estimate of the location of the mobile station 26 when the data message is received by the mobile station 26, in an alternate embodiment, the geographic location may be based upon a tracked location of the mobile station 26 when the data message is sent to the mobile station 26 by continuously maintaining a database on mobile locations of corresponding mobile stations.

In step S16 following step S14, the detector 104 detects received profile attributes 106 associated with the received data message. The received profile attributes 106 may be expressly set forth in the header in accordance with an agreed-upon standard or the detector 104 may need to derive the received profile attributes 106 from a header or contents of the data message. In accordance with the preferred embodiment, the received data message is provided with a header in a known or standardized format such that the detector 104 can merely reference the header and retrieve the receive profile attribute without consuming processing resources necessary to read a body or other contents of the received data message. Thus, received data messages may be categorized by the detector 104 into different categories for treatment by different corresponding filtering rules 118 within the filter 116 based upon the detection of the received profile attributes 106.

In step S18, a filter 116 filters the received data messages based on a comparison between the detected profile attributes 106 of step S16 and the applicable stored profile attributes of step S14. Filtering generally refers to passing all or a portion of a receive data message or blocking all or a portion of the receive data message from receipt at a particular mobile station 26. The applicable stored profile attributes are attributes which are associated with the active profile (of the stored profiles 112) stored in the database 110. The active profile attributes are established in accordance with user preferences by the profile generator-selector 108. The detected profile attributes represent received profile attributes 106, which may be extracted from the header of the received data message or otherwise derived from the received data message in step S16.

In step S18, filtering involves applying filtering rules 118 associated with one or more of the stored profile attributes. At least one filtering rule is invoked upon the matching of received profile attributes to active profile attributes of the active profile. For example, the filter 116 may filter the received data message with respect to the mobile station 26 based on a received sender identifier as a received profile attribute matching a stored sender identifier as a stored profile attribute. The profile attributes allow the user to filter out the data messages in accordance with the mobile subscriber's preferences.

In step S18, numerous configurations are possible for filtering rules 118 and the following examples are presented merely for illustrative purposes. The filtering rules may be based on time, geographic location of the mobile station, content of the data message, mobile station identifier, an origin identifier or other considerations.

In the context of filtering based on time considerations, the filter 116 may filter the received data message with respect to the mobile station 26 based on a received time of day of the data message falling within a stored range of a time of day. For example, a filtering rule may apply to the received data message such that mobile station 26 receives the messages containing stock quotes during normal business hours and not during non-business hours. Similarly, the filter 116 may filter the received data message with respect to the mobile station 26 based on a received day of week of the data message falling within a range of the stored days of the week. For instance, a filtering rule may apply to the received data such that the mobile station 26 receives sport information on the weekend or during non-business hours.

In the context of filtering based on content of the received data message, the filter 116 may filter the received data message with respect to the mobile station 26 based on a received subject key word or combination of key words within the data message matching a stored subject key word or stored combination of subject key words. In another example, the filtering step may filter the received data message with respect to the mobile station 26 based on a received key word within the body of the data message matching a stored subject key word. Such content-based filtering may be used to block obscene or pornographic content from reaching juvenile users of mobile stations 26.

In the context of filtering based on geographic location, the filter 116 may filter the received data message with respect to the mobile station 26 based on a received geographic identifier of the data message being within a certain range or a maximum range of a stored geographic location of the mobile station 26 when the data message is sent to the mobile station 26. The stored geographic location may be determined based on the latest known location of the mobile station 26. The stored geographic location of the mobile station 26 is updated as the mobile station 26 moves throughout a wireless communication system. The maximum range may refer to a radius from a mobile station 26 operational area or geographic location. The above-received geographic identifier may represent geographic coordinates of the base station location.

In another example, the filtering step S18 deletes data messages with a predefined identifier that are received during a first range of mobile station locations and transmits data messages with the predefined identifier that are received during a second range of mobile station locations. The first range of mobile station locations and the second range of mobile station locations may be estimated from last known mobile station locations or determined in another suitable manner.

In yet another example, the filter 116 may filter the received data message with respect to the mobile station 26 based on received sender identifier matching stored sender identifier. In still another example, the filtering step of S18 deletes data messages with a predefined mobile station identifier that are received during a first time range and transmits data messages with the predefined mobile station identifier that are received during a second time range.

The above filtering rules 118 for step S18 provide a prodigious variety of practical applications for screening content, or passing or blocking receive data messages for a mobile station 26. The above filtering rules may be used in combination.

The filtering step S18 may include selecting a delivery method from a group of possible delivery methods to the mobile station 26. The selected delivery method determines if the converter 120 should convert the format of the message prior to delivery or forwarding by the transmitter 122. The group of delivery methods may include one or more of the following: short messaging service (SMS), translation of text into a voice call, fax output, transmission over a shared data channel, transmission over a dedicated data channel, and other suitable data transmission techniques. The filter 116 may select a group of mobile stations, such as all mobile stations 26 in a specific geographic area, to facilitate transmission to the group.

In addition to selecting a delivery method in step S18, the filter 116 may determine a minimum quality of service for the transmission channel of the air interface for communication to the subscriber station. The air interface refers to at least the downlink path between the base station subsystem 22 and the mobile station 26. The transmitter 122 transmits data on the minimum quality of service to the mobile switching center 16, the base station subsystem 22, or both so that base station subsystem 22 may maintain the minimum quality of service. The minimum quality of service may be based on a determination of whether the downlink signal, the uplink signal, or both (for a particular mobile station 26) meets a target symbol error rate, a target signal-to-interference ratio, a target signal-to-noise ratio that provides communication service with a desired statistical reliability or availability for the particular mobile station 26.

In step S20, once the data is filtered by the filter 116, the wireless data server 12 may perform appropriate actions based upon the applied filtering rules 118 and user preferences. The wireless data server 12 may deliver the filtered data message or perform another appropriate action in conformance with the active profile and one or more associated filtering rules. In one example, the wireless data server 12 may deliver a short messaging service message to the mobile station 26, which is indicative of the content of the complete data message to give the mobile station 26 a preview of the data message content. In another example, the wireless data server 12 may forward the filtered data message to a certain address. The wireless data server 12 may transmit the and forward the data message to a client 10 or 17. In yet another example, the wireless data server 12 may store the data message for future transmission or may merely delete the data message if the data message was filtered or blocked in accordance with the filtering rules 118.

FIG. 5 illustrates changing an active profile based on the occurrence of a triggering event in accordance with the invention. The procedure of FIG. 5 may be carried out anywhere between steps S10 and S14 of FIG. 4, for example. Starting in step S22, the wireless data server 12 evaluates whether a timer, associated with the mobile station 26, has expired. If the timer has expired, then the method continues with step S30 in which the generator-selector 108 generates or selects a new active filtering profile. If the timer has not expired, the method continues with step S24.

In step S24, the wireless data server 12 determines whether the geographic location of the mobile station 26 has changed. The wireless data server 12 may accept input from a data source such as a home location register or a visitor location register to determine whether the location change has occurred. Further, the location change may not be regarded as a change unless the change exceeds a minimum threshold value such as a radius of so many meters from an original location or exceeding the geographic boundary of a metropolitan area. If the location has changed, then the method continues with step S30. If the location does not change, then the method continues with step S26.

In step S26 of the wireless data server 12 determines if there is a change in the available transport options associated with the mobile station 26. The transport options generally refer to technical characteristics of the air interface between the base station and the mobile station 26 in the wireless network. The technical characteristics of the air interface for (a particular mobile station 26) may include one or more of the following: bandwidth capacity, data format, error correction, modulation scheme (e.g., TDMA, CDMA, or GSM compliant), time delays from signal processing associated with the air interface, maintenance of a minimum target level of quality (e.g., bit error rate) of communications service over the air interface, and dedicated and shared channels over the air interface. Short-messaging service (SMS), cellular digital packet data (CDPD), code-division multiple access (CDMA), time-division multiple access (TDMA), global system for mobile communications (GSM), general packet radio services (GPRS) and universal mobile test system (UTMS) are some examples of transport options.

The change in available transport options (e.g., from CDMA to GSM or vice versa) may be judged on a downlink basis versus an uplink basis. The downlink basis refers to the transmission path between the base station subsystem 22 and the mobile station 26 and the reverse link refers to the path from the mobile station 26 to the base station subsystem 22. The uplink path and downlink path may not be symmetrical in bandwidth so the change in available transport options may be based upon the uplink path throughput, the downlink path data throughput, or both. If there has been a significant change in the available transport options, then the method continues with step S30. Otherwise, if there's not a sufficient change in the available transport options, the method continues with step S28, in which user preferences may be updated.

In step S26, a change in a transport option for a particular mobile station 26 may include changing the time delay associated with transmission and/or reception over the air interface (e.g., coding or re-transmission scheme changes that affect delay), switching between dedicated and shared channels, and sensing changes in a target quality level (e.g., bit-error rate) of the channel.

In step S28, the user preferences may be updated from the mobile station 26, from a subscriber client 10 coupled to the communications network 20, or both. In FIG. 5, the user changing a user preference may be treated as a triggering event that is received from an upstream or downstream transmission of the subscriber to the wireless data server 12. Alternatively, a service provider may update the user preferences in response to an ordinary telephone call from a subscriber to a wireless data service provider. If the user updates user preferences, the method continues with step S30. Otherwise, the method loops back to wait for another event among step S22 through step S28. The triggering events set forth in FIG. 5 are presented for exemplary purposes and other different events may be used to practice the invention.

In accordance with the method and system of the invention, the detected profile attributes are readily standardized according to standards followed by the content service provider in order to gain access to the mobile service subscribers. The operator of the wireless data server may readily update profile attributes of stored profiles to coincide with changes to the standardized detected profile attributes after coordinating such updates with the content service provider. Accordingly, the flexibility in establishing the detected profile attributes and stored profile attributes is well-suited for evolving with changes in the form or content of the underlying data messages addressed to the mobile station.

The method and system of the invention facilitates lower power consumption and advanced longevity of battery charges by allocating filtering tasks to the wireless data server, as opposed to the mobile station. Further, the service provider can reduce undesired traffic on the wireless system (including the air interface) by allowing the subscriber to determine the active profile and filter messages even before the messages are transmitted over the air interface to the mobile station.

The specification describes various illustrative embodiments of the method and system of the present invention. The scope of the claims is intended to cover various modifications and equivalent arrangements of the illustrated embodiments disclosed in the specification. Therefore, the following claims should be accorded the reasonably broadest interpretation to cover modifications equivalent structures, and features which are consistent with the spirit and scope of the invention disclosed herein.

What is claimed is:

1. A method of providing configurable data services for mobile stations, the method comprising the steps of:

selecting an active profile from a plurality of stored profiles associated with a corresponding mobile station, the active profile being selected in accordance with a triggering event;

receiving a data message at a wireless data server, the data message addressed to at least one of the wireless data server and the mobile station;

accessing the active profile for the mobile station to which the received data message is addressed to determine applicable stored profile attributes associated with the active profile;

detecting received profile attributes associated with the received data message;

filtering the received data message based on a comparison between the detected profile attributes and the stored profile attributes.

2. The method according to claim 1 wherein the triggering event comprises changing location of the mobile station.

3. The method according to claim 1 wherein the triggering event comprises expiration of a timer associated with the mobile station.

4. The method according to claim 1 wherein the triggering event comprises changing an available transport option of an air interface for the mobile station.

5. The method according to claim 1 wherein the triggering event comprises changing a delay of an air interface for the mobile station.

6. The method according to claim 1 wherein the establishing step includes determining at least one filtering rule based on the mobile station location at or after the time of receipt of the data message at the wireless data server.

7. The method according to claim 6 wherein the filtering step deletes data messages with a predefined identifier that are received during a first range of mobile station locations and transmits data messages with the predefined identifier that are received during a second range of mobile station locations.

8. The method according to claim 1 wherein the filtering step filters the received data message with respect to the mobile station based on a received geographic identifier in the data message when the data message is received by the mobile station.

9. The method according to claim 1 wherein the filtering step filters the received data message with respect to the mobile station based on a stored geographic location of the mobile station when the data message is received by the mobile station, wherein the stored geographic location of the mobile station is updated as the mobile station moves throughout a wireless communications system.

10. The method according to claim 1, further comprising:

determining a minimum quality of service for the transmission channel of the air interface for communication to the mobile station.

11. A method of providing configurable data services for mobile stations, the method comprising the steps of:

selecting an active profile from a plurality of stored profiles associated with a corresponding mobile station, the active profile being selected in accordance with at least one of a mobile station location and a transport option;

receiving a data message at a wireless data server, the data message addressed to at least one of the wireless data server and the mobile station;

accessing the active profile for the mobile station to which the received data message is addressed to determine applicable stored profile attributes associated with the active profile;

detecting received profile attributes associated with the received data message;

filtering the received data message based on a comparison between the detected profile attributes and the stored profile attributes.

12. The method according to claim 11 wherein the establishing step further comprises determining at least one filtering rule based on the current mobile station location.

13. A method of providing configurable data services for mobile stations, the method comprising the steps of:

establishing an initial active profile associated with a corresponding mobile station;

changing from the initial active profile to a revised active profile with a different filtering rule if a triggering event occurs, the revised active profile being selected from a plurality of stored profiles associated with the corresponding mobile station;

receiving a data message at a wireless data server, the data message addressed to the mobile station;

accessing the revised active profile for the mobile station to which the received data message is addressed to determine applicable stored profile attributes associated with at least one of the initial active profile and the revised active profile;

detecting received profile attributes associated with the received data message;

filtering the received data message based on a comparison between the detected profile attributes and the stored profile attributes.

14. The method according to claim 13 wherein, in the changing step, the triggering event comprises an expiration of a timer associated with a mobile station.

15. The method according to claim 13 wherein, in the changing step, the triggering event comprises a change in location of the mobile station.

16. The method according to claim 13 wherein, in the changing step, the triggering event comprises a change in an available transport option of the mobile station.

17. The method according to claim 13 wherein, in the changing step, the triggering event comprises a change in a user preference associated with the mobile station.

18. A system for providing configurable data services for mobile stations, the system comprising:

a profile generator/selector that selects an active profile from a plurality of stored profiles associated with a corresponding mobile station, the profiler storing the active profile in a database, the active profile being selected in accordance with at least one of a mobile location, a transmission rate and an air interface delay;

a receiver for receiving a data message at a wireless data server, the data message addressed to the mobile station;

a retriever for accessing the active profile in the database for the mobile station to which the received data message is addressed to determine applicable stored profile attributes associated with the active profile;

a detector for detecting received profile attributes associated with the received data message;

a filter for applying filtering to the received data message based on a comparison between the detected profile attributes and the stored profile attributes.

\* \* \* \* \*